United States Patent
Hu (10) Patent No.: US 10,122,868 B2
(45) Date of Patent: Nov. 6, 2018

(54) SUBMITTING CAPTURED DATA TO AN ANALYTICS SERVICE

(71) Applicant: Canon Europa N.V., Amstelveen (NL)

(72) Inventor: Jiawei Hu, Uxbridge (GB)

(73) Assignee: Canon Europa N.V., Amstelveen (NL)

( * ) Notice: Subject to any disclaimer, the term of this patent is extended or adjusted under 35 U.S.C. 154(b) by 4 days.

(21) Appl. No.: 14/857,225

(22) Filed: Sep. 17, 2015

(65) Prior Publication Data

US 2016/0088165 A1    Mar. 24, 2016

(30) Foreign Application Priority Data

Sep. 19, 2014  (EP) .................................. 14185645

(51) Int. Cl.
| | |
|---|---|
| *H04N 1/00* | (2006.01) |
| *G06F 3/12* | (2006.01) |
| *G06F 8/20* | (2018.01) |
| *G06F 9/54* | (2006.01) |

(52) U.S. Cl.
CPC ....... *H04N 1/00039* (2013.01); *G06F 3/1203* (2013.01); *G06F 3/1229* (2013.01); *G06F 3/1259* (2013.01); *G06F 3/1285* (2013.01); *G06F 8/20* (2013.01); *G06F 9/541* (2013.01); *G06F 9/542* (2013.01); *H04N 1/00042* (2013.01); *H04N 1/00061* (2013.01); *H04N 1/00079* (2013.01); *H04N 1/00204* (2013.01); *H04N 1/00217* (2013.01); *H04N 2201/0075* (2013.01); *H04N 2201/0094* (2013.01); *H04N 2201/3212* (2013.01)

(58) Field of Classification Search
CPC ........... H04N 1/00039; H04N 1/00204; H04N 1/00217; H04N 1/00042; H04N 1/00061; H04N 1/00079; H04N 2201/3212; H04N 2201/0075; H04N 2201/009; G06F 3/1229; G06F 3/1259; G06F 3/1203; G06F 8/20; G06F 9/541; G06F 9/542; G06F 3/1285
USPC ....................................................... 358/1.15
See application file for complete search history.

(56) References Cited

U.S. PATENT DOCUMENTS

| | | | | |
|---|---|---|---|---|
| 2007/0124510 A1* | 5/2007 | Ando | ........................ | G06F 8/68 710/8 |
| 2008/0271060 A1* | 10/2008 | Akiyoshi | ............... | G03G 15/50 719/328 |
| 2011/0063639 A1* | 3/2011 | Yagiura | ................. | G06F 3/1205 358/1.9 |

(Continued)

FOREIGN PATENT DOCUMENTS

WO    2013/115188 A1    8/2013

*Primary Examiner* — Kent Yip
(74) *Attorney, Agent, or Firm* — Canon U.S.A., Inc. IP Division (57) ABSTRACT

A method of submitting an event relating to MFP device activity to an analytics service. The method of submitting an event to an analytics service comprises a receiving step of receiving a command in a first format. A writing step is provided to write a value of the received command to a stored property. A monitoring step is provided to monitor the property to determine whether or not the property has changed. A transmission step is provided to, in the case that it is determined that a stored property has changed, transmit an event corresponding to the updated property to the analytics service in accordance with a second format.

14 Claims, 7 Drawing Sheets

(56) References Cited

U.S. PATENT DOCUMENTS

| | | | |
|---|---|---|---|
| 2012/0194851 A1* | 8/2012 | Srinivasmurthy | G06F 3/1204 358/1.15 |
| 2012/0246248 A1 | 9/2012 | Arita | |
| 2014/0240753 A1* | 8/2014 | Anno | G06F 3/1236 358/1.15 |
| 2015/0043031 A1* | 2/2015 | Oguma | G06F 3/1207 358/1.15 |

* cited by examiner

SUBMITTING CAPTURED DATA TO AN ANALYTICS SERVICE

CROSS-REFERENCE TO RELATED APPLICATION

The present application claims priority from European patent application no. 14185645.0 filed on 19 Sep. 2014. The content of EP 14185645.0 is incorporated by reference.

TECHNICAL FIELD

The present invention relates to a method of submitting an event relating to MFP device activity to an analytics service, and MFP and a computer-readable storage medium.

DESCRIPTION OF RELATED ART

Opportunities to develop customised software applications for a device provided by a vendor are increasingly common.

Software developers can create, for example, JAVA applications. Installing and running such applications on a device offers different functionality to the functionality originally provided by the device.

In order for such customised applications to be installed, a device is required to be provided with a suitable software application platform embedded into its firmware at manufacture thereby providing an environment suitable for such customised applications to run.

Customised applications running on the application platform remain independent from the device system software and can be independently installed/uninstalled to/from the device. A number of customised applications may be installed on a device at any one time creating an almost limitless scope to provide additional functionality to the device.

Such applications, when in use, can generate various forms of usage data. For an application owner to further understand and optimise the application and/or the device onto which the application is installed, it can be beneficial for the application owner to measure, collect, analyse and report on such usage data. Analytic services such as, for example, Google Analytics and Webtrends are tools which make it possible to gather information regarding the application and/or the device onto which the application is installed. Utilising an analytics service to analyse an application offers scope to potentially allow the application/device vendors/owners access to usage data which may well provide key business insights.

The present invention concerns submitting data regarding application and/or device activity to an analytics service.

SUMMARY OF THE INVENTION

According to a first aspect of the present invention there is provided a method of submitting an event relating to MFP device activity to an analytics service, the method comprising: a receiving step of receiving a command in a first format; a writing step of writing a value of the received command to a stored property; a monitoring step of monitoring the property to determine whether or not the property has changed; a transmission step of, in the case that it is determined that a stored property has changed, transmitting an event corresponding to the updated property to the analytics service in accordance with a second format. In some embodiments the stored properties are stored within a service wrapper installed on the MFP device.

In some embodiments a service monitor performs the monitoring step.

In some embodiments the service monitor performs transmission of the updated properties.

In some embodiments the received command having the first format is defined in accordance with a service oriented framework. In such embodiments the first format may be defined in accordance with an OSGi framework.

In some embodiments the transmitted event has the second format which is defined by the analytics service. In such embodiments the service monitor may be configured to transmit the event using a HTTP post request.

In some embodiments the received command relates to at least one of scanning, copying, printing and e-mailing functions of the MFP device.

In some embodiments the received command relates to MFP device consumables.

In some embodiments the received command relates to application page view patterns.

In some embodiments the received command relates to application users.

A further aspect of the present invention provides a program which, when run on a device, causes the device to execute a method according to any one of claims 1 to 13.

A further aspect of the present invention provides a computer-readable storage medium storing a program according to claim 13.

A further aspect of the present invention provides an MFP device configured to submit an event relating to MFP device activity to an analytics service, the MFP device comprising: receiving means to receive a command in a first format; writing means to write a value of the received commands to a stored property; monitoring means to monitor the property to determine whether or not the property has changed; transmission means to, in the case that it is determined that a stored property has changed, transmit an event corresponding to the updated property to the analytics service in accordance with a second format.

BRIEF DESCRIPTION OF THE DRAWINGS

An embodiment of the present invention will now be described, by way of example only, with reference to the accompanying drawings in which.

DESCRIPTION OF THE EMBODIMENTS

Figure 1:
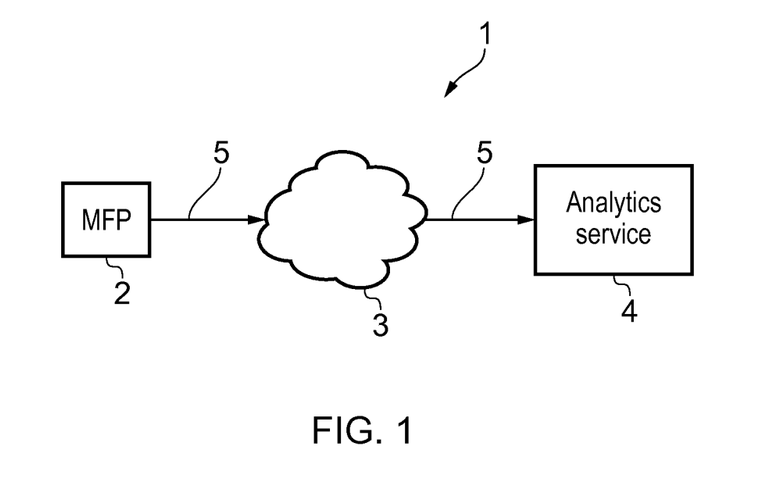
FIG. 1 illustrates a system comprising an MFP device configured to submit data to an analytics service.

FIG. 1 illustrates an MFP device 2 configured to be able to communicate via a network 3 with an analytics service 4.

Figure 2:
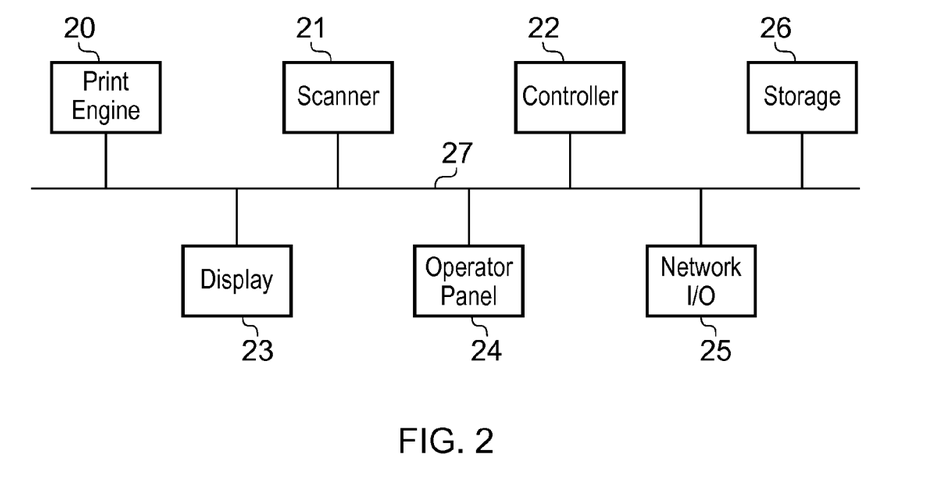
FIG. 2 illustrates a hardware configuration of a MFP device.

FIG. 2 shows the hardware configuration of the MFP device 2. The MFP device 2 comprises a print engine 20, which consists of the hardware for printing onto a display medium such as paper, acetate, or some other display medium; a scanner 21; a controller 22 which controls operation of the various components of the MFP 2; a display panel 23, which is a touch screen display for displaying information to a user and for receiving commands by a user's touch; an operator panel 24, which includes buttons and/or other input devices for receiving user instructions; and a network I/O 25 that allows the MFP device 2 to communicate over the network 3; storage 26 for storing MFP internal software. The components of the MFP device 2 are connected to each other via a bus 27. Optionally, the MFP device 2 may include additional hardware of the types known in the art.

MFP device 2 internal software stored on the MFP's 2 storage 26 is Java based and runs in a Java Virtual Machine within the MFP device 2.

In addition to specific software packages provided on the MFP's 2 storage 26, the manufacturer, through a Software Development Kit (SDK), also provides the ability for customised software to be independently developed to communicate with the MFP device 2. An SDK is typically a set of software development tools that allows the creation of applications for a certain software package, software framework, hardware platform, computer system or similar development platform. The development or application platforms (software required to run the applications developed using the SDK) are embedded into the firmware of a device at manufacture.

Applications may be developed and added to the MFP device 2 by virtue of the development platform and its associated software architecture. Via installation of such customised applications to the MFP device 2 further functionality can be added according to specific requirements.

Figure 3:
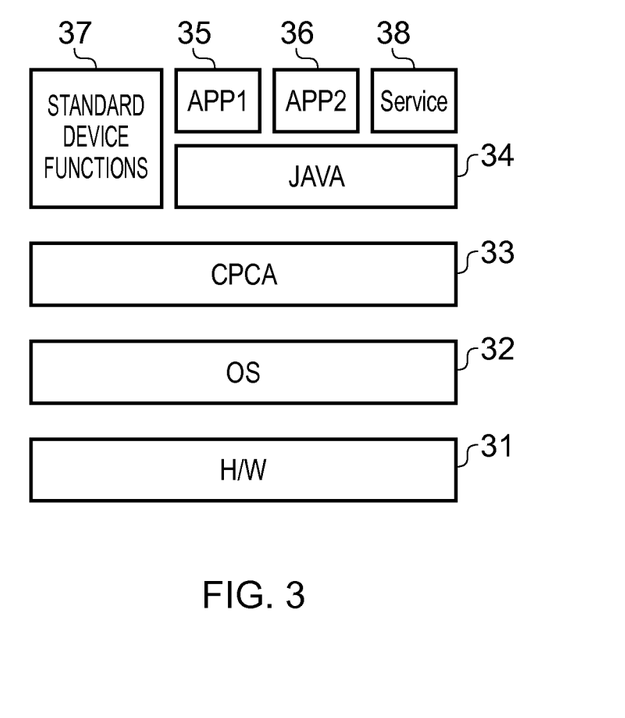
FIG. 3 illustrates a software configuration of a MFP device.

FIG. 3 illustrates the software architecture suitable for implementation on the MFP device 2. Whilst the diagram is schematic it shows a general hierarchy between software components. The hardware layer 31 at the bottom comprises all of the device's hardware such as those described in FIG. 2. The OS layer 32 provides an interface between software and hardware and manages MFP device 2 software and hardware resources. The OS layer 32 also includes drivers for controlling the hardware. Above the OS layer 32 is a common peripheral controlling architecture (CPCA) 33 that is a proprietary protocol and instruction set that is designed to support programming code for handling the physical operations as well as monitoring and reporting state errors in the MFP device 2. The CPCA 33 includes a CPCA class library that allows JAVA applications to access information about the status of the device and to control functions of the device, including functions relating to printing, copying and scanning. Above the CPCA layer 33, there is provided a JAVA virtual machine 34 that allows JAVA applications 35 and 36 to run. The software also includes standard device functions 37 that are provided with the MFP 2 when purchased that provide complete software for printing, copying, scanning, etc. In addition, custom applications known as services 38 may be installed on the MFP 2. These services may be accessed by the JAVA applications 35 and 36 and can be used to extend the functionality of the MFP 2.

In general, in a case that a developer wishes to use an SDK to create a customised application for an MFP device 2 and for it to successfully communicate with an analytics service 4 in the manner described above, the developer is required to have knowledge of not only the hardware and software platform and architecture of the MFP device 2, but also a knowledge of the interface (web API) for the analytics service 4 and the format in which events are to be submitted to the analytics service 4. The developer would then include commands to access and register events with the analytics service 4 in the customised application on an application-by-application basis.

In order to interact with an analytics service 4, a customised application installed on an MFP device 2 would be configured to send an http request to the analytics service each time a particular function or feature of the application is called and executed. The application submits an associated http request 5 via the network 3 to the analytics service 4. The associated http request 5 can be submitted to the analytics service 4 with specific submission properties customised to a format of the analytics service 4. The analytics service 4 updates according to the received http submission 5 and is therefore able to record information on the function in respect of which the http request is provided. Programming http requests 5 into an application can result in an http submission 5 to an analytics service 4 when, for example, a function such as print, copy, scan, fax etc. is called or even the number of times one of these functions is called but fails to correctly execute. The recording of, and access to, such data events can provide a vendor or owner of the application, upon accessing the analytics service 4, with detailed insights as to how a particular application or device is being used or how it is operating 'in the field'.

The present invention has been provided in light of problems with the application-by-application approach described above. However, it is not implied that the approach described above forms part of the state of the art.

Figure 4:
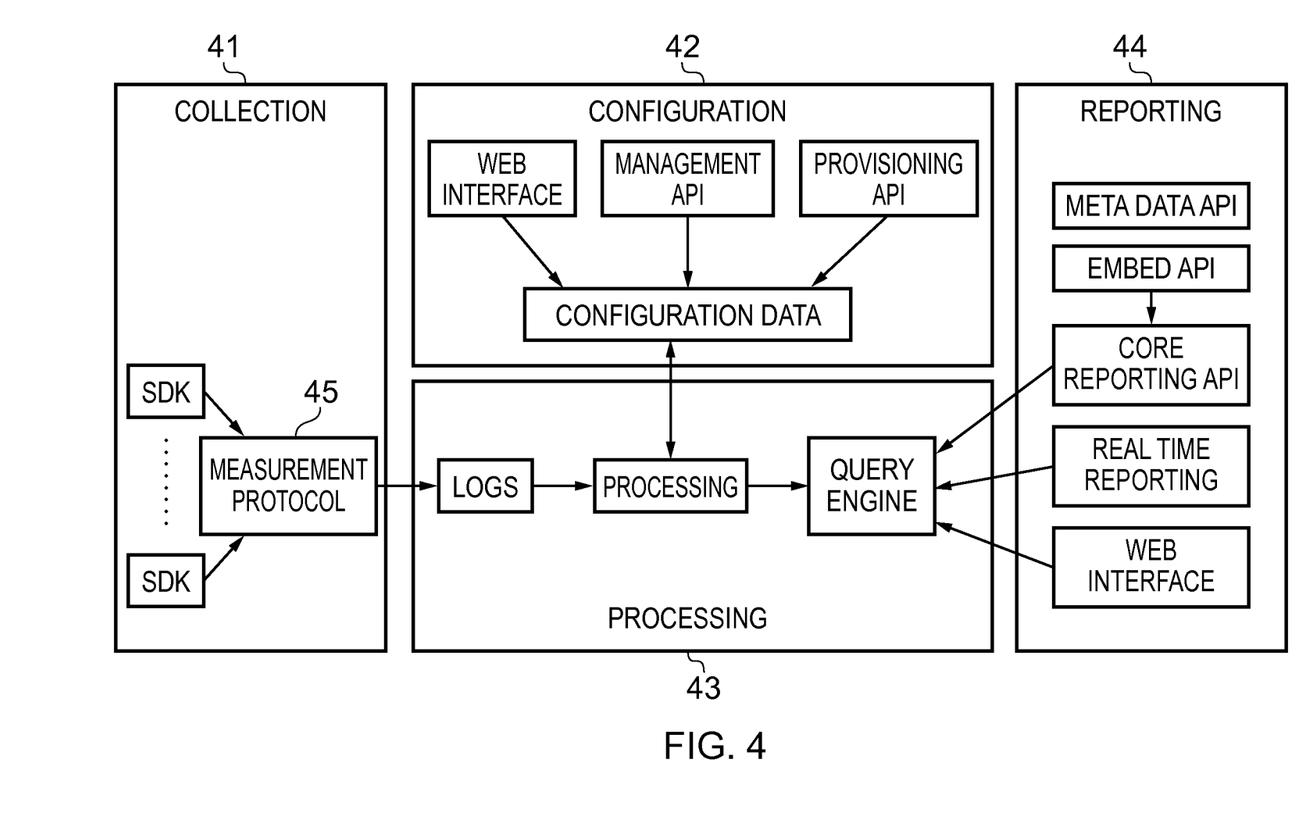
FIG. 4 illustrates a user interface of an analytics service.

FIG. 4 illustrates a platform of an analytics service 4 which allows for measurement of reported events from various devices and environments. Such a platform provides computing resources to collect, store, process and report on submitted properties or events. Developers using an SDK are able to interact with the web API of an analytics service 4 through a user interface, client libraries and APIs which are, for example, organised into four main components: collection 41 to collect event data; configuration 42 to manage how data is processed; processing 43 to process the collected data according to the configuration; and reporting 44 which provides simple and powerful access to the processed data in a user-friendly format.

As mentioned above, it is desirable for multiple applications to be installed on an MFP device 2 at any one time thereby creating an almost limitless amount of additional functionality on the MFP device 2 allowing for the device to be customised to specific requirements. However, allowing developers/owners of MFP devices 2 capabilities to develop and install/uninstall customised applications to meet bespoke requirements can, for example, over a period of time result in functionalities of existing applications being incorporated into newly developed applications. In such a scenario, it is possible that a MFP device 2 has applications embedded which attempt to submit the same data to an analytics service 4. Such a scenario would result in duplication of submissions at the analytics service 4 and therefore an inaccurate recording of submitted properties or events.

With the above in mind, the present invention has been developed to alleviate the above identified problems.

According to the configuration which will be described below, it is not required that an application developer has knowledge of an analytics service 4 interface (web API), or indeed how to submit a request to the analytics service 4. An application developer needs only know a set of properties such as for example a pre-determined string and a value which can be submitted to a service 38 and stored as part the service 38.

Figure 5:
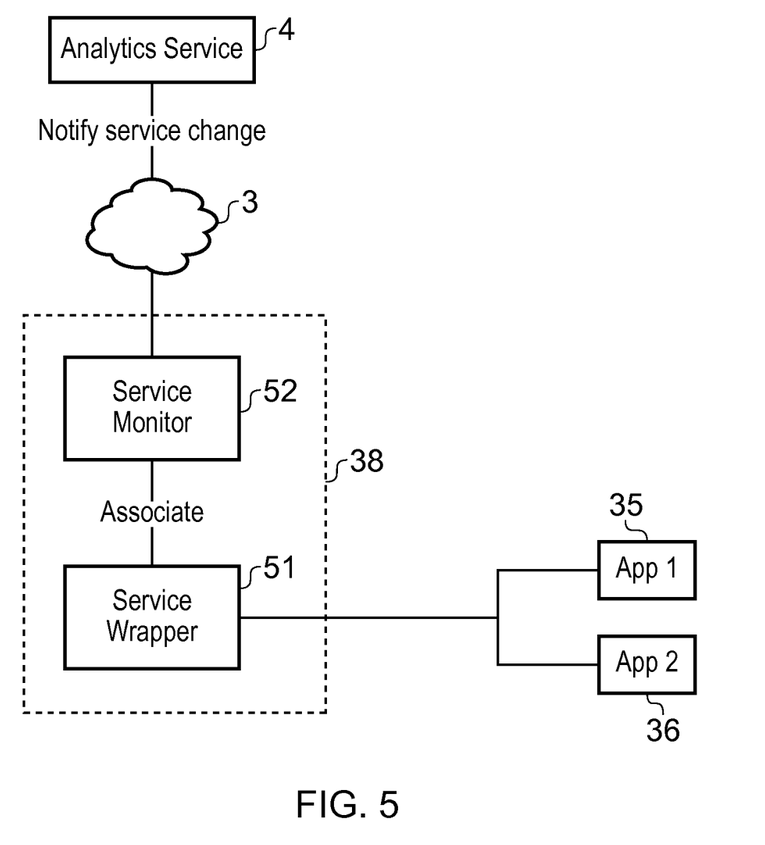
FIG. 5 illustrates an architecture configuration according to the system of FIG. 1.

FIG. 5 illustrates a configuration which allows for submission of properties from an MFP device 2 to an analytics service 4.

Applications 35 and 36 developed by a developer using an SDK are installed on an MFP device 2. A service 38 is also implemented onto an MFP device 2 using a service oriented framework such as, for example, the Open Service Gateway initiative (OSGi). Implementation through a widely used service oriented framework such as OSGi results in the service being easy to call by using standard OSGi commands.

Service 38 comprises a service wrapper 51 and a service monitor 52. Service wrapper 51 stores a set of specific properties which are pre-defined by the service 38 designer. The set of properties defined in the service wrapper 51 are defined such that each property corresponds to an event which is tracked by the analytics service 4.

Figure 6:
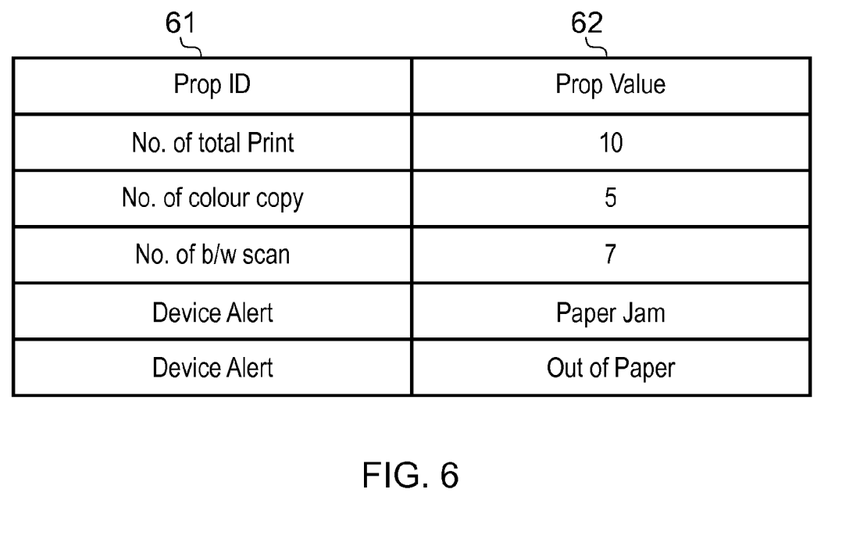
FIG. 6 illustrates a format in which a list of properties may be stored.
Figure 7:
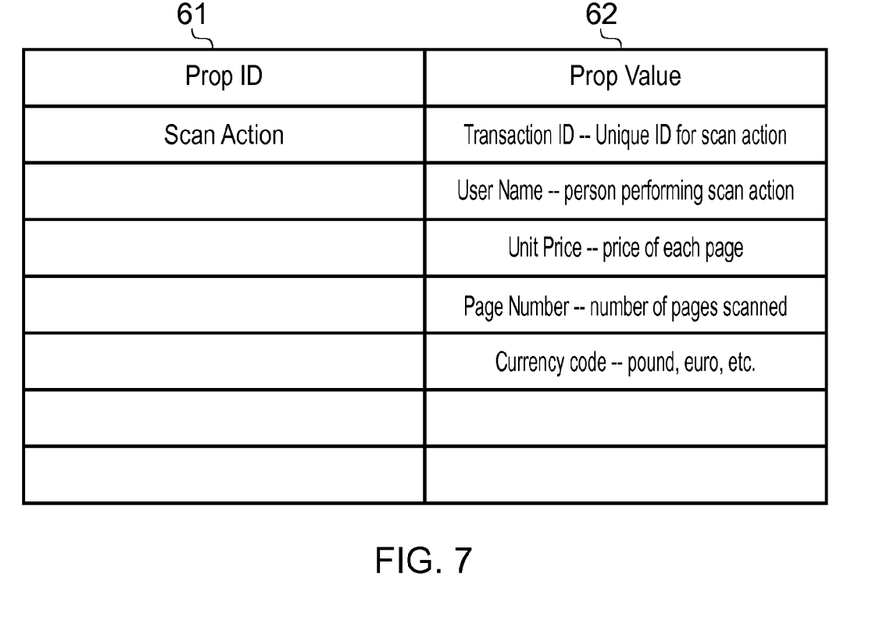
FIG. 7 further illustrates a format in which a list of properties may be stored.

FIG. 6 illustrates a list of properties which for example can be stored as a set of specific properties within the service wrapper 51. Properties within the service wrapper 51 comprise two parts: prop id 61 and prop value 62. Prop id 61 can store a string used to identify a specific property. Prop value 62 can store a string or a value such as an integer which is associated with the prop id. Further, prop values can, as illustrated in FIG. 7, include a host of information related to a function or action performed on an MFP device 2.

Service monitor 52 monitors each of the specific properties defined within the service wrapper 51 for any updates or adjustments to the stored properties.

Applications 35 and 36 can make reference to and write to the pre-defined specific properties of the service 38 and service wrapper 51 using standard OSGi commands. A guide to standard OSGi commands and a list of the pre-defined specific properties stored within the service wrapper 51 can be provided to developers as part of an SDK.

An application developer with access to the guide provided as part of the SDK is able to embed such commands into the applications 35 and 36 so that each time a particular function or feature of the application 35 and 36 is called and executed, a command formatted to correspond to a specific property stored within the service wrapper 51 is submitted to the service wrapper 51 and the stored property is updated accordingly.

In the case that the service monitor 52 detects an update or change to the properties stored in the service wrapper 51 the service monitor 52 notifies the analytics service 4.

The service monitor 52 upon detecting an update or adjustment to the specific properties of the service wrapper 51 is configured to submit a post request to the analytics service 4 in accordance with the measurement protocol 45 of the of the analytics service 4. The service monitor 52 is configured to send an http request to the analytics service 4 in order to submit the updated properties as an event in a format in accordance with measurement protocol 45. The submission of the http request by the service monitor 52 to the analytics service 4 updates the tracked event of the analytics service 4 which corresponds to the stored property of the service wrapper 51 which has been updated by virtue of the service wrapper 51 receiving a command from an application 35 and 36. Accordingly, the event of analytics service 4 is updated each time the corresponding property of service wrapper 51 is updated.

Properties within the service wrapper can be accessed for example using a command such as an addprop function which defines both the prop id 61 to be accessed and the prop value 62 which should be used to add to or update the prop id 61. For example, in the case that a black and white scan is performed on an MFP device 2, application 35 or 36 can be configured to submit to a service 38 the addprop function where the prop id 61 is specified as a string such as "No. of b/w scan" and the prop value 62 is specified as a integer value 7 such that the property "No. of b/w scan" stored within service wrapper 51 is updated to show that 7 black and white scans have been performed on the MFP device 2. In turn, service monitor 52 by virtue of monitoring for changes in the properties stored within service wrapper 51 submits an http request 5 to the analytics service 4 to update the corresponding tracked event.

As such, the developer of an application 35 and 36 is able to refer to a guide provided as part of an SDK and easily embed standard commands into their application which via service 38 is able to submit MFP device 2 activity to an analytics service 4. The application developer is not required to have any knowledge of the analytics service 4 or indeed the format in which data should be submitted to the analytics service 4. Further, as the properties are predefined and centrally stored there is no opportunity for different application developers to accidentally use different event definitions for submission to the analytics service 4. The analytics service 4 will always receive HTTP requests in the same format and relating to the particular events with properties defined in the service wrapper 51.

Further, rather than have multiple applications installed on the MFP device 2 all configured to call the analytics service 4 with the same events and risk duplicating data submissions, the service monitor 52 watches for changes in the stored properties of the service wrapper 51 so that if different applications submit the same command, comprising the same values, the service monitor 52 is configured to not submit such duplications to the analytics service 4 thereby ensuring that the events tracked by the analytics service 4 are accurately maintained.

The above has been described with service 38 being installed on MFP device 2 and applications 35 and 36 being installed on the same MFP device 2. It is to be understood, however, that service 38 may be installed on a separate device to the device on which applications 35 and 36 are installed. Further, service wrapper 51 and service monitor 52 have been described as a bundle forming service 38 however service wrapper 51 and service monitor 52 may be installed on a device as separate services. Further still, service wrapper 51 may be installed on a device separate to the device on which service monitor 52 is installed.

The invention claimed is:

1. A method of submitting an event relating to MFP device activity, from any one of multiple applications installed on an MFP device to an analytics service that measures events that occur on the MFP device, the MFP performing a method comprising:

any one of the multiple applications installed on the MFP device writing a value in a first format to a stored property of the MFP device to update the stored property, the stored property corresponding to an event that occurs on the MFP device and that is monitored by the analytics service;

monitoring the stored property of the MFP device to determine whether or not the stored property is changed;

transmitting an event to the analytics service in accordance with a second format in the case that it is determined that a stored property of the MFP device is changed, the transmitted event corresponding to the updated stored property of the MFP device; and updating the analytics service based on the event in accordance with the second format so that a property of the analytics service that corresponds to the changed stored property of the MFP device is also updated each time a stored property of the MFP device is updated.

2. The method according to claim 1, wherein the stored properties of the MFP device are stored within a service wrapper installed on the MFP device.

3. The method according to claim 1, wherein a service monitor performs the monitoring.

4. The method according to claim 1, wherein a service monitor performs transmission of the updated properties.

5. The method according to claim 4, wherein the service monitor is configured to transmit the event using a HTTP post request.

6. The method according to claim 1, wherein the first format in which the any one of the multiple applications writes to a stored property of the MFP device is defined in accordance with a service oriented framework.

7. The method according to claim 1, wherein the first format is defined in accordance with an OSGi framework.

8. The method according to claim 1, wherein the format of the transmitted event having the second format is defined by the analytics service.

9. The method according to claim 1, wherein the stored properties of the MFP device and properties of the analytics service relate to at least one of scanning, copying, printing, and e-mailing functions of the MFP device.

10. The method according to claim 1, wherein the stored properties of the MFP device and properties of the analytics service relate to MFP device consumables.

11. The method according to claim 1, wherein the stored properties of the MFP device and properties of the analytics service relate to application page view patterns.

12. The method according to claim 1, wherein the stored properties of the MFP device and properties of the analytics service relate to application users.

13. A non-transitory computer-readable storage medium storing a program which, when executed on a device, causes the device to execute a process of submitting an event relating to MFP device activity, from the device to an analytics service that measures events that occur on the MFP device, the process comprising:

any one of the multiple applications installed on the MFP device writing a value in a first format to a stored property of the MFP device to update the stored property, the stored property corresponding to an event that occurs on the MFP device and that is monitored by the analytics service;

monitoring the stored property of the MFP device to determine whether or not the stored property is changed;

transmitting an event to the analytics service in accordance with a second format in the case that it is determined that a stored property of the MFP device is changed, the transmitted event corresponding to the updated stored property of the MPF device; and updating the analytics service based on the event in accordance with the second format so that a property of the analytics service that corresponds to the changed stored property of the MFP device is also updated each time a stored property of the MFP device is updated.

14. An MFP device configured to submit an event relating to MFP device activity, from any one of multiple applications installed on the MFP device to an analytics service that measures events that occur on the MFP device, the MFP device comprising:

one or more processors;

memory storing instructions that, when executed by the one or more processors, cause the MFP device to execute steps of:

writing a value, from any one of the multiple applications installed on the MFP device, to a stored property of the MFP device to update the stored property, the stored property corresponding to an event that occurs on the MFP device and that is monitored by the analytics service;

monitoring the stored property of the MFP device to determine whether or not the stored property is changed; and transmitting an event to the analytics service in accordance with a second format in the case that it is determined that a stored property of the MFP device is changed, the transmitted event corresponding to the updated stored property of the MFP device; and updating the analytics service based on the event in accordance with the second format so that a property of the analytics service that corresponds to the changed stored property of the MFP device is also updated each time a stored property of the MFP device is updated.

* * * * *